US009718067B2

(12) United States Patent
Ballhause et al.

(10) Patent No.: US 9,718,067 B2
(45) Date of Patent: Aug. 1, 2017

(54) CENTRIFUGE DRIVE HEAD FOR RELEASABLY CONNECTING A DRIVING SYSTEM TO A ROTOR OF A CENTRIFUGE, A SET AND A CENTRIFUGE COMPRISING THE DRIVE HEAD

(71) Applicant: Thermo Electron LED GmbH, Langenselbold (DE)

(72) Inventors: Norman Ballhause, Windhausen (DE); Sebastian Henne, Goettingen (DE)

(73) Assignee: Thermo Electron LED GmbH, Langenselbold (DE)

( * ) Notice: Subject to any disclaimer, the term of this patent is extended or adjusted under 35 U.S.C. 154(b) by 594 days.

(21) Appl. No.: 13/912,299

(22) Filed: Jun. 7, 2013

(65) Prior Publication Data

US 2013/0331253 A1 Dec. 12, 2013

(30) Foreign Application Priority Data

Jun. 8, 2012 (DE) .......................... 10 2012 011 531

(51) Int. Cl.
*B04B 9/08* (2006.01)
*B04B 9/00* (2006.01)
*F16D 1/116* (2006.01)

(52) U.S. Cl.
CPC .................. *B04B 9/00* (2013.01); *B04B 9/08* (2013.01); *F16D 1/116* (2013.01); *B04B 2009/085* (2013.01)

(58) Field of Classification Search
CPC ........ B04B 9/08; B04B 2009/085; B04B 9/00

USPC ............... 494/12, 16, 20, 33, 38, 64, 84, 85; 210/232

See application file for complete search history.

(56) References Cited

U.S. PATENT DOCUMENTS

| | | | |
|---|---|---|---|
| 2,865,662 A | | 12/1958 | Nurmse |
| 6,063,018 A | * | 5/2000 | Letourneur ............... B04B 9/08 403/327 |
| 8,678,987 B2 | * | 3/2014 | Henne ....................... B04B 9/08 494/12 |
| 9,339,824 B2 | * | 5/2016 | Henne ....................... B04B 9/08 |

(Continued)

FOREIGN PATENT DOCUMENTS

| | | | |
|---|---|---|---|
| DE | 197 21 335 A1 | 12/1997 | |
| DE | 19930593 A1 | * 4/2000 | ............... B04B 9/08 |

(Continued)

OTHER PUBLICATIONS

Espacenet, English Machine Translation of DE19721335A1, Published on Dec. 18, 1997, retrieved from http://worldwide.espacenet.com on Jun. 3, 2013 (9 pages).

(Continued)

*Primary Examiner* — Charles Cooley
(74) *Attorney, Agent, or Firm* — Wood Herron & Evans LLP

(57) ABSTRACT

A centrifuge drive head for releasably connecting a driving system to a rotor of a centrifuge. The centrifuge drive head comprises a base body mounted for rotation about an axis of rotation (R) and at least a first and a second coupling element, mounted on the base body for swinging outwardly about a swivel axis. The first and second coupling elements differ from each other in at least one of outer shape, mass, material and/or mounting height on the base body.

22 Claims, 9 Drawing Sheets

(56) References Cited

U.S. PATENT DOCUMENTS

| | | | | |
|---|---|---|---|---|
| 9,452,436 | B2* | 9/2016 | Ballhause | B04B 9/00 |
| 9,539,588 | B2* | 1/2017 | Le Guyader | B04B 9/08 |
| 2004/0229742 | A1 | 11/2004 | Potter | |
| 2011/0212822 | A1* | 9/2011 | Henne | B04B 9/08 494/84 |
| 2013/0237399 | A1* | 9/2013 | Letourneur | B04B 9/08 494/10 |
| 2013/0331253 | A1* | 12/2013 | Ballhause | B04B 9/00 494/84 |
| 2014/0329658 | A1* | 11/2014 | Le Guyader | B04B 9/08 494/82 |
| 2015/0231648 | A1* | 8/2015 | Henne | B04B 9/08 494/84 |
| 2015/0343459 | A1* | 12/2015 | Ballhause | B04B 9/00 494/43 |
| 2016/0107171 | A1* | 4/2016 | Bittner | B04B 9/08 494/84 |
| 2016/0158769 | A1* | 6/2016 | Hornek | B04B 9/08 494/83 |
| 2017/0050194 | A1* | 2/2017 | Hornek | B04B 7/00 |

FOREIGN PATENT DOCUMENTS

| | | |
|---|---|---|
| DE | 10 2008 045 556 A1 | 3/2010 |
| EP | 0 911 080 A1 | 4/1999 |
| EP | 0 712 667 B1 | 2/2000 |
| WO | 2011/001729 A1 | 1/2011 |
| WO | WO 2011001729 A1 * | 1/2011 |
| WO | WO 2011054906 A1 * | 5/2011 ............... B04B 9/08 |

OTHER PUBLICATIONS

Espacenet, English Machine Translation of EP0712667B1, Published on Feb. 9, 2000, retrieved from http://worldwide.espacenet.com on Jun. 3, 2013 (12 pages).

German Patent Office, Office Action for Application No. 10 2012 011 531.8, mailed Feb. 26, 2013 (6 pages).

Espacenet, English Machine Translation of EP0911080A1, Published on Apr. 28, 1999, retrieved from http://worldwide.espacenet.com on Jun. 3, 2013 (11 pages).

Espacenet, English Machine Translation of DE102008045556A1, Published on Mar. 4, 2010, retrieved from http://worldwide.espacenet.com on Jun. 3, 2013 (11 pages).

* cited by examiner

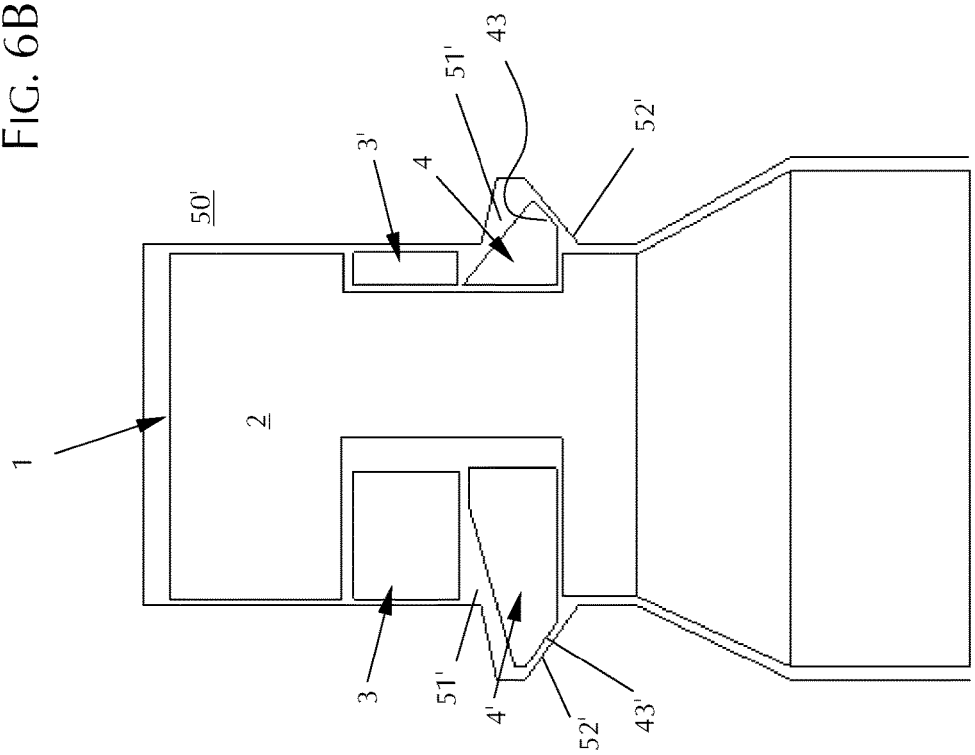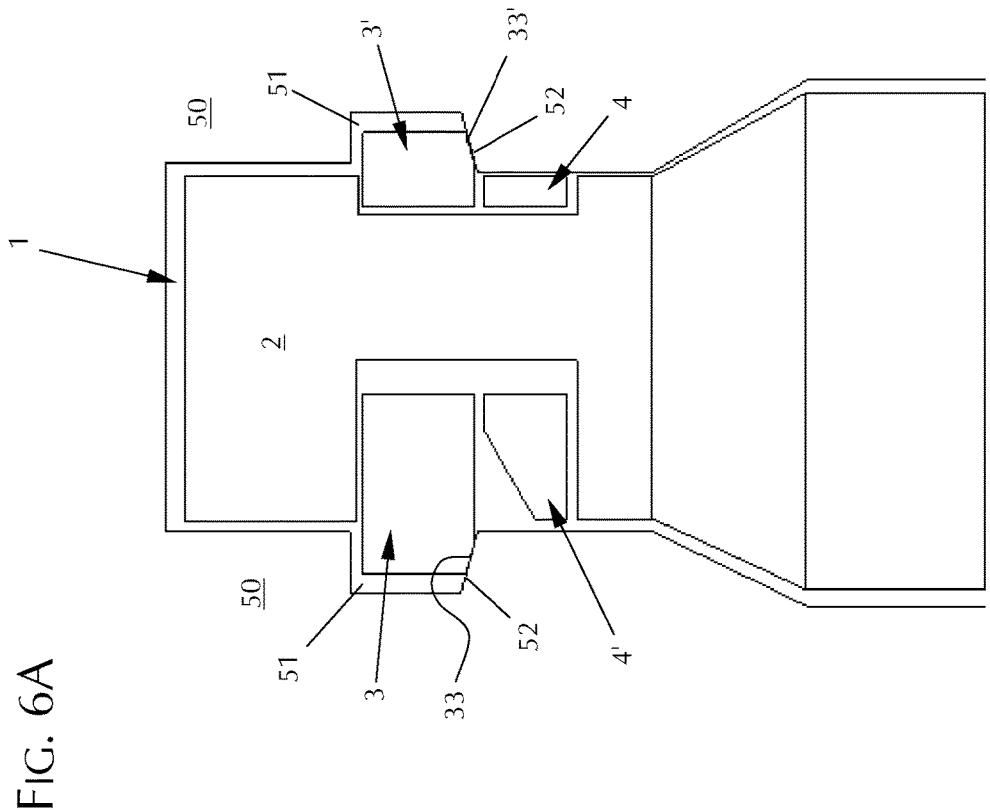

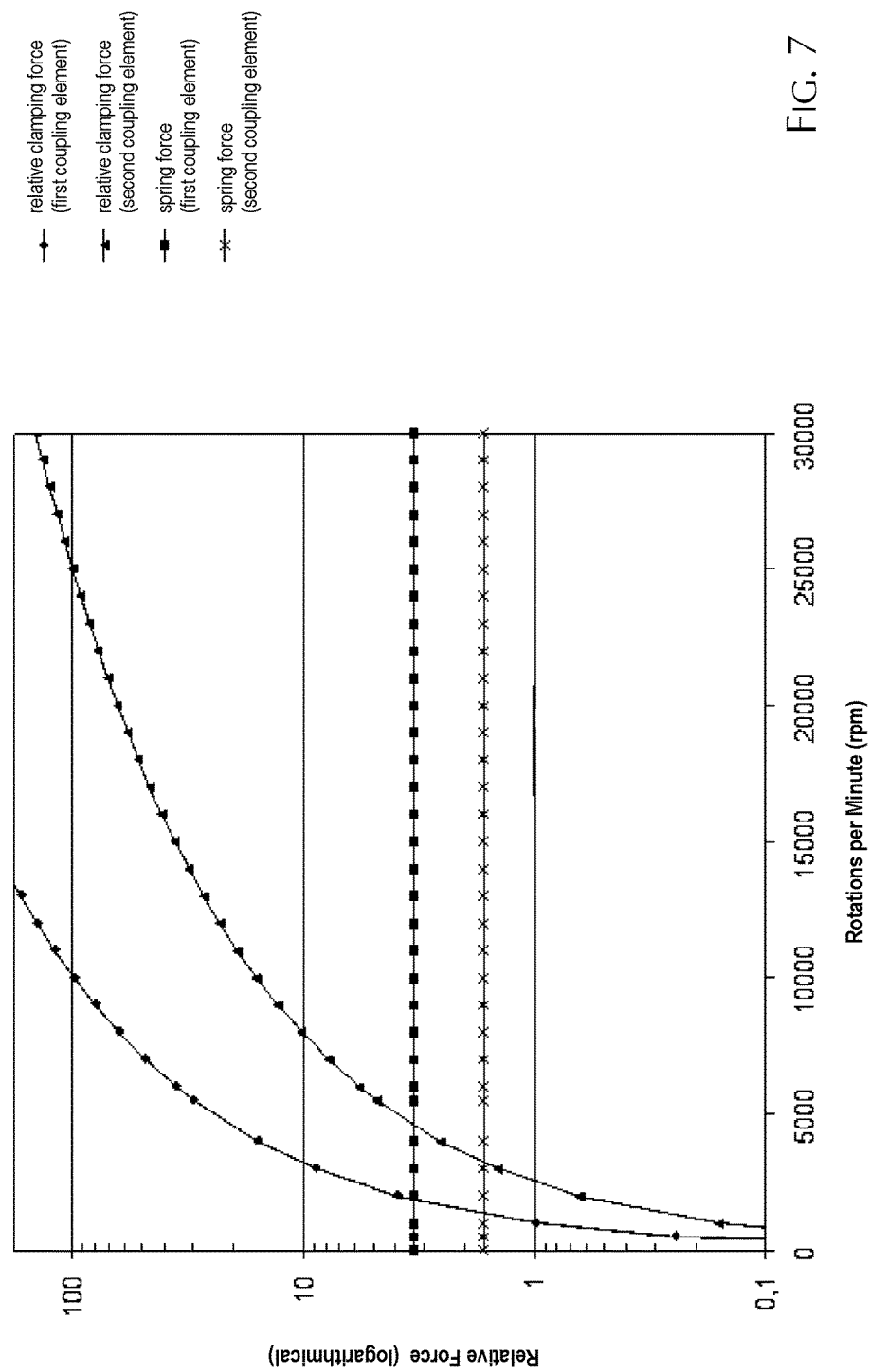

CENTRIFUGE DRIVE HEAD FOR RELEASABLY CONNECTING A DRIVING SYSTEM TO A ROTOR OF A CENTRIFUGE, A SET AND A CENTRIFUGE COMPRISING THE DRIVE HEAD

CROSS-REFERENCE TO RELATED APPLICATIONS

The present application claims priority under 35 U.S.C. §119 of German Patent Application No. 10 2012 011 531.8, filed Jun. 8, 2012, the disclosure of which is hereby incorporated herein by reference in its entirety.

FIELD OF THE INVENTION

The present invention relates to centrifuges that hold sample containers and are used for separating the constituents of the samples contained therein at a high rotational speed of a centrifuge rotor. More particularly, the present invention relates to a centrifuge drive head for releasably connecting a driving system to a rotor of a centrifuge, which drive head comprises a base body and at least two coupling elements capable of swinging outwardly from the same. The present invention further relates to a set for a centrifuge, which set consists of a centrifuge drive head and at least one hub for a rotor. Finally, the present invention also relates to a centrifuge comprising the drive head or the set.

BACKGROUND OF THE INVENTION

The prior art discloses a number of solutions by means of which a rotor of a centrifuge can be mounted firmly on a drive shaft. For example, it is known to press the rotor onto a conical seat of a drive shaft by means of a screw thread.

DE 197 21 335 A1 discloses a solution in which a rotor is mounted on the drive shaft by means of a special chuck. This solution is not self-locking and requires a tool for detaching the rotor.

A self-locking solution is disclosed in EP 0 712 667 B1. However, the unlocking mechanism disclosed therein is difficulty available for many conventional designs of rotor, and the rotor is not guided sufficiently without play, which might result in dynamic instability at relatively high loads and rotational speeds.

EP 0 911 080 A1 discloses a system that ensures substantial absence of play and good accessibility to the unlocking mechanism. However, it is only suitable for specific types of rotor that do not generate any forces (for example, buoyancy forces) contrary to the coupling direction.

DE 10 2008 045 556 A1 develops the principle of EP 0 911 080 A1 and explicitly provides for counteracting buoyancy forces up to a force of approximately 100 N. At forces below this value, it is impossible to unlock the rotor from the drive head in the axial direction. However, this system reaches its limits when higher buoyancy forces and/or very high rotational speeds occur. In the case of high buoyancy forces and simultaneous pivoting of the coupling elements or in the case of poorer properties of the friction combination, the self-locking feature of the system is overridden and the rotor can become unlocked from the drive head in the axial direction. Furthermore, the rotor gets jammed as a result of the high centrifugal forces at very high rotational speeds and the coupling cannot always be easily detached.

SUMMARY OF THE INVENTION

It is thus an object of the present invention to overcome the disadvantages of the prior art mentioned above. More particularly, it is an object of the present invention to provide a centrifuge drive head comprising a self-locking and rapidly releasable coupling, which drive head ensures that the rotor is fixed securely over a wide range of rotational speeds ranging from the idle state of the rotor up to 30,000 rpm (revolutions per minute) without becoming jammed. Furthermore, the present invention is to be universally applicable, that is to say, it should function for fast-rotating light rotors as well as for slow-rotating heavy rotors. Moreover, the present invention should be able to absorb high axial forces that might result from buoyancy.

According to a first aspect, the present invention relates to a centrifuge drive head for releasably connecting a driving system to a rotor of a centrifuge, which drive head comprises a base body capable of rotating about an axis of rotation and at least one first coupling element and at least one second coupling element, which coupling elements are mounted on the base body for swinging outwardly about a swivel axis. The first and second coupling elements differ from each other. The centrifuge drive head will hereinafter also only be called "drive head". It is attached in a per se known manner to the drive shaft, either integrally or by a fastening means, and transfers the driving force from the centrifuge motor to the rotor.

Thus the design of the centrifuge drive head is basically equivalent to that of the drive head disclosed in DE 10 2008 045 556 A1 owned by the Applicant, but it is distinguished therefrom by virtue of the fact that at least two different coupling elements are used. These coupling elements serve, in a manner known per se (cf. DE '556), to removably mount a rotor on the centrifuge drive head. In the inwardly pivoted position of the coupling elements, they either do not protrude from the external periphery of the centrifuge drive head or they protrude therefrom only to the extent that the rotor and/or the hub thereof can be fitted to the centrifuge drive head or removed therefrom. By contrast, in the outwardly pivoted position of the coupling elements, they protrude from the external periphery of the centrifuge drive head to an extent such that they engage the rotor and/or its hub in an undercut and thus lock it to the centrifuge drive head. The outward pivoting movement of the coupling elements can be effected as a result of the centrifugal force generated during rotation or, preferably, by attaching the coupling elements to the centrifuge drive head such that they are biased, for example, by springs (likewise cf. DE '556). The advantage of the biased mounting of the coupling elements is that the rotor is locked to the centrifuge drive head right from the idle state of the centrifuge.

According to the present invention, as described above, use is made of at least two coupling elements that differ from each other. Advantageously, they differ from each other, for example, in at least any one of the following properties: their external shape, their weight, their material, and the level at which they are attached to the base body in relation to the axis of rotation. It is particularly preferred in one embodiment that the first coupling element be larger and/or heavier than the second coupling element. The purpose of using different coupling elements is that each is adapted for use under different operating conditions and, in particular, in different ranges of rotational speeds. Thus, for example, the first coupling element is adapted to couple a rotor within the low speed range, while the second coupling element is used for coupling a rotor within the high speed range. Examples of possible different operating conditions can also include other external conditions such as the size and/or weight of the rotor to be used, the type of samples to be processed or the like that may require different rotational speeds and/or result in different forces acting on the drive head.

Most preferably according to one embodiment, the variable usage of the different coupling elements can be explained with reference to the set which is likewise subject matter of the present invention. The set for a centrifuge comprises, apart from the centrifuge drive head of the present invention, a hub for a rotor. The hub is configured to receive the drive head and to transfer the driving force of a centrifuge motor to the rotor by way of a drive shaft connected to the drive head. Additionally, the set can include at least one rotor that can be joined, or is joined, to the hub. The hub and the rotor can thus be in the form of separate components capable of being joined together or they may alternatively be formed integrally.

As described above, the coupling elements serve to releasably connect the drive head to the hub and thus ultimately to the rotor. Advantageously, the hub is provided with at least one notch, with which the coupling element can engage in an outwardly pivoted state, and can thus come into contact with at least one of the walls delimiting the notch and thus lock the drive head to the hub or the rotor. The position, size, and shape of the at least one notch are matched to the coupling elements mounted on the drive head. The notch is designed such that different outwardly pivoted states of the mutually differing coupling elements of a drive head are achieved depending on the type of hub having a specific configuration of the at least one notch and fitted to the drive head.

In a first possible variant, for example, the hub comprises a notch configured such that only one of the first and second coupling elements can pivot into the notch and come into contact with at least one of the walls of the notch when the hub is fitted to the drive head. More particularly, the notch has for this purpose a size, shape, and/or position in the hub that allows it to accommodate one of the two coupling elements, but prevents the other coupling element from pivoting into the notch for the reason that it is either too large for the notch or the position of the notch does not correspond to the outwardly pivoted position of the coupling element. Thus the use of a specific hub results in a selection between the two coupling elements, only one of which can be used for coupling and locking the hub and, therefore, the rotor. This selected coupling element can then be configured specifically to suit the operating conditions encountered, while, conversely, coupling elements that are not suitable for these operating conditions are prevented from being used. More particularly, coupling elements can be used on a drive head, of which one is designed for use in the low speed range and the other in the high speed range. The combination of a suitable "low speed hub" on the one hand and a "high speed hub" on the other ensures that only the coupling element suitable for the intended speed range is in use at any one time. It is thus not necessary to replace the drive head when the operating speed changes, which facilitates handling of the centrifuge considerably. Rather, the centrifuge can be operated by means of one and the same drive head, without incurring any problems, over a very large range of rotational speeds of up to 30,000 rpm.

As described above, the properties of the coupling elements are matched to the operating conditions, preferably by varying their external shape, their weight, and/or their material. Usually, a coupling element for a low speed range is larger than a coupling element for the higher speed range and is thus generally heavier than the latter and/or is made of a material of higher density. One reason for this is that relatively high buoyancy forces act in the axial direction on the coupling element for the low speed range (hereinafter referred to as "the low speed coupling element", which corresponds to the first coupling element of the present invention), which forces have to be absorbed by the coupling element. Secondly, the risk of the coupling element and the hub becoming jammed together is smaller at relatively low rotational speeds than at higher rotational speeds. This makes it possible for the coupling element to be large and heavy. However, the use of this coupling element in the relatively low speed range, in which the locking force increases rapidly as the rotational speed increases, does not give rise to any critical values that would no longer allow the coupling element to be disengaged from the hub.

The first coupling element can comprise, for example, an upper cover face facing the push-on side of the rotor as it is fitted to the hub and a bottom cover face more remote from said push-on side of the rotor, which top and bottom cover faces are located in planes that are substantially parallel to each other and extend at right angles to the axis of rotation. The term "substantially" refers to the fact that said surfaces include, for example, mounting holes or indentations for rotatably mounting the coupling elements. Furthermore, said surfaces can, as a whole or in part, be slightly beveled particularly in the region of the free end of the coupling element, in the inward pivoted direction and/or towards the free end in order to facilitate the inward pivotal movement of the coupling element into the notch of the hub and to be able to better control the contact force exerted by the coupling element on the hub (cf. DE 10 2008 045 556 A1). The angle of inclination of the cover faces taken as a whole is usually less than 5°, more particularly less than 2°. Recesses, holes or partial angle of inclinations of the cover faces usually occupy no more than 30%, preferably a maximum of 20%, of the total area of an cover face. Advantageously, the perpendicular surface joining the top and bottom cover faces is parallel to the axis of rotation and has a shape, in terms of its radial course, that follows the shape of the drive head in the region in which the coupling element is mounted. Such a coupling element can swing into a notch that is simple to produce and that has a cross-section that is substantially rectangular in a direction encompassing the axis of rotation.

Advantageously, in one embodiment, the coupling element for the high speed range (hereinafter referred to as the "high speed coupling element", corresponding to the second coupling element of the present invention), is, as described above, of a smaller size and weight than the low speed coupling element. This can be achieved, for example, by reason of the fact that the second coupling element tapers towards its outwardly pivotable free end. Preferably, the cover face of the second coupling element facing the push-on side of the rotor is tapered, while the cover face of the second coupling element that faces away from the said push-on side of the rotor is in the form of a contact surface of the second coupling element that rests against the wall of the notch. More preferably, in one embodiment, the second coupling element is shaped such that its upper cover face facing the push-on side of the rotor slopes downwardly towards the outwardly pivotable free end. The lower weight of the second coupling element contributes to a reduction of the contact force exerted by the coupling element on the hub and thus reduces the risk of the two components becoming jammed together and unable to be separated from each other. The relatively low weight further results in a comparatively low contact force at relatively low rotational speeds, which contact force rises only when there is an increase in the rotational speed. Advantageously, the risk of the second coupling element and the hub becoming jammed at very high rotational speeds is further reduced, according to the present invention, due to the fact that the contact surface by means of which the second coupling element bears against the wall of the notch of the hub is configured, as far as possible, to be only as small as is necessary for locking the hub/rotor securely to the drive head. A reduction in the area of contact and thus in the positive fit to a minimum facilitates separation of the hub/rotor from the drive head.

As described above and generally disclosed in DE 10 2008 045 556 A1, the locking force of the coupling elements can be set very precisely when the contact surfaces of the coupling element and the hub are in the form of ramp shaped faces. The first and/or the second coupling element and particularly the second (high speed) coupling element that is particularly at risk of becoming wedged into the notch can comprise a ramp shaped face at its outwardly pivotable end, which ramp shaped face extends obliquely relative to a plane extending at right angles to the axis of rotation. Preferably, this ramp shaped face is located on the bottom cover face of the coupling elements that faces away from the push-on side of the rotor and slopes upwardly towards the outwardly pivotable free end. The angle of inclination of the ramp shaped face is selected according to the desired clamping force whilst allowing for the desired speed ranges. Usually, the angle of inclination, relative to a plane extending at right angles to the axis of rotation, ranges between 2° and 60°, preferably between 5° and 50°, and most preferably between 10° and 40°. It is likewise possible for the angle of inclination of the ramp shaped face of the first coupling element to differ from that of the second coupling element and for the angle of inclination of both coupling elements to specifically match the locking forces required in each case. For example, the angle of inclination of the ramp shaped face of the first coupling element can be smaller than that of the second coupling element.

The above design of the first and second coupling elements can be generally used for all drive head/hub combinations and not only for the case described above, where the hub comprises a notch configured such that only one of the first and second coupling elements can swing into the notch. It is principally advantageous to match the coupling elements to the hub such that the first coupling element engages the hub only at relatively low rotational speeds, and, on the other hand, does not lock the hub to the drive head at high rotational speeds in order to prevent the hub and the first coupling element from becoming jammed together at high rotational speeds. On the other hand, it is generally of no avail when the second coupling element also contributes to the process of locking the hub/rotor on the drive head at low rotational speeds. The combination of the two coupling elements may even be of advantage for increasing the locking force. Generally, the use of the first coupling element alone, or of the first and the second coupling elements together, is conceivable for locking the hub/rotor to the drive head at relatively low rotational speeds. In this connection, it should be noted that there is usually no exact dividing line between the high and the low speed ranges, but rather there exists an overlap zone of average rotational speeds for the implementation of the first and second coupling elements, and it is possible to use both the first and the second coupling element in this overlap zone. Advantageously, the entire range of rotational speeds covered by a particular centrifuge can be divided such that each of the coupling elements used covers an approximately equally large sub-range. Thus when a centrifuge is designed for a speed range of from 0 rpm to 30,000 rpm, the first coupling element can be designed, for example, for a speed range of up to approximately 15,000 rpm and the second coupling element for a range of from 10,000 rpm to 30,000 rpm, it being possible to use both coupling elements in the middle speed range of from 10,000 rpm to 15,000 rpm.

In a further drive head/hub combination, the hub comprises a notch and allows the first and the second coupling element to pivot into its notch when the hub is fitted to the drive head, while the first coupling element comes into contact with at least one of the walls, preferably only one wall, delimiting the notch. Since the first coupling element contributes to the process of locking the hub/rotor to the drive head in this case, this set is advantageously used in the lower speed range. The second coupling element can be configured such that it likewise comes into contact with at least one of the walls, preferably only one wall, of the notch of the hub when it swings into the notch. In this case, the second coupling element assists in intensifying the locking force, as described above. Alternatively, it is possible for the second coupling element to be configured such that it has no contact with the walls of the notch when it pivots into the notch. Then the first coupling element alone ensures that the rotor is locked to the drive head.

According to one embodiment of the present invention, a set for a centrifuge preferably comprises more than one hub for an associated drive head. The term "hub", as already mentioned, can mean, in this case, a hub per se that is capable of being connected to a suitable rotor or that is already permanently or detachably connected to the rotor, and the term "permanently connected" should also be understood to mean that the hub is integrated in the rotor and the hub and the rotor are designed as one piece. The use of two or more different hubs makes it possible, as described above, to adapt the centrifuge to suit specific operating conditions such as specific speed ranges, without requiring the user to alter anything on the centrifuge or its components—apart from appropriately selecting the hub or the rotor connected to the hub. In order to make it easier for the user to select a suitable hub, the latter may be marked accordingly. For example, the suitable hub may be color-coded according to the intended speed range.

More particularly, a set can comprise, for example, two different hubs, the notches of which are configured differently, such that the first hub allows only the first coupling element, and the second hub only the second coupling element, to swing into the respective notch when the hub is fitted to the drive head. Alternatively, two different hubs may be provided, the notches of which are configured differently, such that the first hub allows the first and second coupling elements to swing into the notch, and the second hub allows only the second coupling element to swing into its notch, when the hub is fitted to the drive head. In the case of the first hub, in a preferred variant, the second coupling element does not bear against the walls of the notch, while the first coupling element is in contact with at least one of the walls, preferably only one wall, delimiting the notch. The purposes, effects, and advantages of the respective possibilities have been set out above in the description of the individual hubs.

In the same way as described above, more than two coupling elements can cooperate with the associated hubs. The range of variation with which the centrifuge is adapted to suit specific applications or operating conditions increases with the number of coupling elements. Thus it is possible, for example, to even more precisely adapt the centrifuge to suit speed ranges within which different combinations of coupling elements are used and to cooperate for the purpose of connecting the drive head to the hub/rotor. The additional coupling elements differ from the first and the second coupling elements at least in terms of the location at which they are mounted on the drive head, but they can also exhibit additional differences from at least one of the two coupling elements. For example, they may differ in shape, in material, or in weight. When more than two coupling elements are used, it is preferred for reasons of space to position several such coupling elements one above the other in the direction of the axis of rotation. Alternatively or additionally, three or more coupling elements may be arranged circumferentially on the drive head, preferably at essentially equal distances. This has the advantage that wobbling of the rotor relative to the drive head can be reduced as compared to a situation where only two coupling elements are present.

Advantageously, the drive head is attached to the rotor by virtue of the fact that at least one of the coupling elements engages a portion of the rotor or its hub in an undercut in the outwardly pivoted state of the coupling element and prevents the rotor from separating from the drive head as long as the coupling element remains in its outwardly pivoted state. This can be effected, for example, as described in DE 10 2008 045 556 A1 where the coupling elements bear against a top edge of the rotor hub. For the purposes of the present invention, however, it is preferred that a suitable notch into which the coupling element can pivot be provided in the region of that internal wall of the hub by means of which the hub rests against the external periphery of the drive head when the hub has been fitted to the drive head. Since the coupling element generally swings outwardly in a direction extending at right angles to the axis of rotation, the notch in the hub preferably extends in the peripheral direction. The coupling element and the notch can cooperate, for example, in the manner of a bayonet lock. For the purpose of fitting the hub/rotor to the drive head, a slide-in bevel can be provided in the hub, for example, which initially presses the coupling elements, which protrude from the external periphery of the drive head due to their biased state, against the drive head to the extent that the hub can be fitted to the drive head. As soon as a coupling element has reached a suitable notch in the hub, it then again swings outwardly and into the notch, and the rotor and the drive head are locked together. In order to restrict the outward pivotal path, end stops can be provided in the hub and/or the coupling elements, for example, in the form of a restriction of the length of the notch in the case of the hub, and in the form of a projection in the case of the coupling element, which projection obstructs the coupling element from pivoting further. Advantageously, an actuator is provided for the purpose of detaching the drive head from the hub, by means of which actuator the outwardly pivoted coupling elements are pivoted so far into the drive head that the rotor can be removed from the same. Reference may be made to conventional bayonet locks or DE 10 2008 045 556 A1 for suitable actuators.

As mentioned above, the coupling elements can be provided with a ramp shaped face. In this case, the notch pertaining to the respective coupling element also comprises a complementary ramp shaped stop face, against which the ramp shaped face of the outwardly pivoted coupling element can bear. Since the force exerted against the ramp shaped stop face when the coupling elements pivot into the notch rises with increasing pivotal movement, a certain degree of restriction of the pivotal path is also achieved in this way. Furthermore, the securing force acting between the coupling element and the hub can be set very precisely by varying the angle of inclination of the ramp shaped faces. Preferably, the ramp shaped stop faces are disposed in the region of the top or bottom wall that delimits the notch in the direction of the axis of rotation and that can be entirely, or only partially, in the form of a ramp shaped face.

Apart from the coupling elements and the associated notches, the drive head and the hub/rotor can be designed as is usual in the art. Preferably, both components rest positively against each other over large areas thereof, as far as possible, in order to ensure that the two components are supported against each other without play. The hub is guided very effectively and the drive head and the hub are secured against forming an angle of inclination when the base body of the drive head comprises a top region as regarded in the direction in which the rotor is fitted to the drive head, which top region has a substantially cylindrical external contour and ensures that the hub is centered and guided in the radial direction, and a bottom region in the form of a truncated cone that adjoins the top region and results in centering of the hub in the axial direction. A hub configured so as to complement such a drive head can be readily fitted to the drive head by means of its truncated conical region, centered as the drive head is further inserted into the hub, and is secured effectively against forming an angle of inclination when its cylindrical portion has been fitted to the drive head. The hub is secured even more effectively against forming an angle of inclination when the truncated conical portion of the drive head is adjoined by a bottom cylindrical region to which a complementary cylindrical internal wall of the hub corresponds. Advantageously, the coupling elements are located approximately at the center of the guide regions of the truncated conical region and the top cylindrical region, preferably in at least one recess of the top region adjoining the truncated conical region.

Materials customary in the art can be used for the fabrication of the drive head and the hub. These are usually metallic materials and, in particular, suitable steels. However, it is also possible to use suitable, particularly fiber-reinforced, composite materials. Preferably, the coupling elements are made of metal. For the first coupling element and its preferred use at relatively low rotational speeds, steel is a preferred material, since it has high strength and is at the same time of high density. For the second coupling element and its preferred use at relatively high rotational speeds, on the other hand, is titanium a preferred material, since it has a strength similar to that of steel, but only approximately 60% of the density of steel. This makes it possible to utilize a coupling element of relatively low weight.

BRIEF DESCRIPTION OF THE DRAWINGS

The invention is explained in greater detail below with reference to the attached figures. Like reference characters denote like components in the schematic representations, which illustrate preferred exemplary embodiments of the invention without restricting the invention to said exemplary embodiments. In the figures:

FIG. 6(A) is a cross-sectional view of a further set of the present invention consisting of a drive head comprising 4 coupling elements and a hub;

FIG. 6(B) is a cross-sectional view of the set as shown in FIG. 5(A) comprising another hub;

FIG. 7 is a graph of the locking forces of different coupling elements as a function of the rotational speed.

DETAILED DESCRIPTION OF THE INVENTION

Figure 1A:
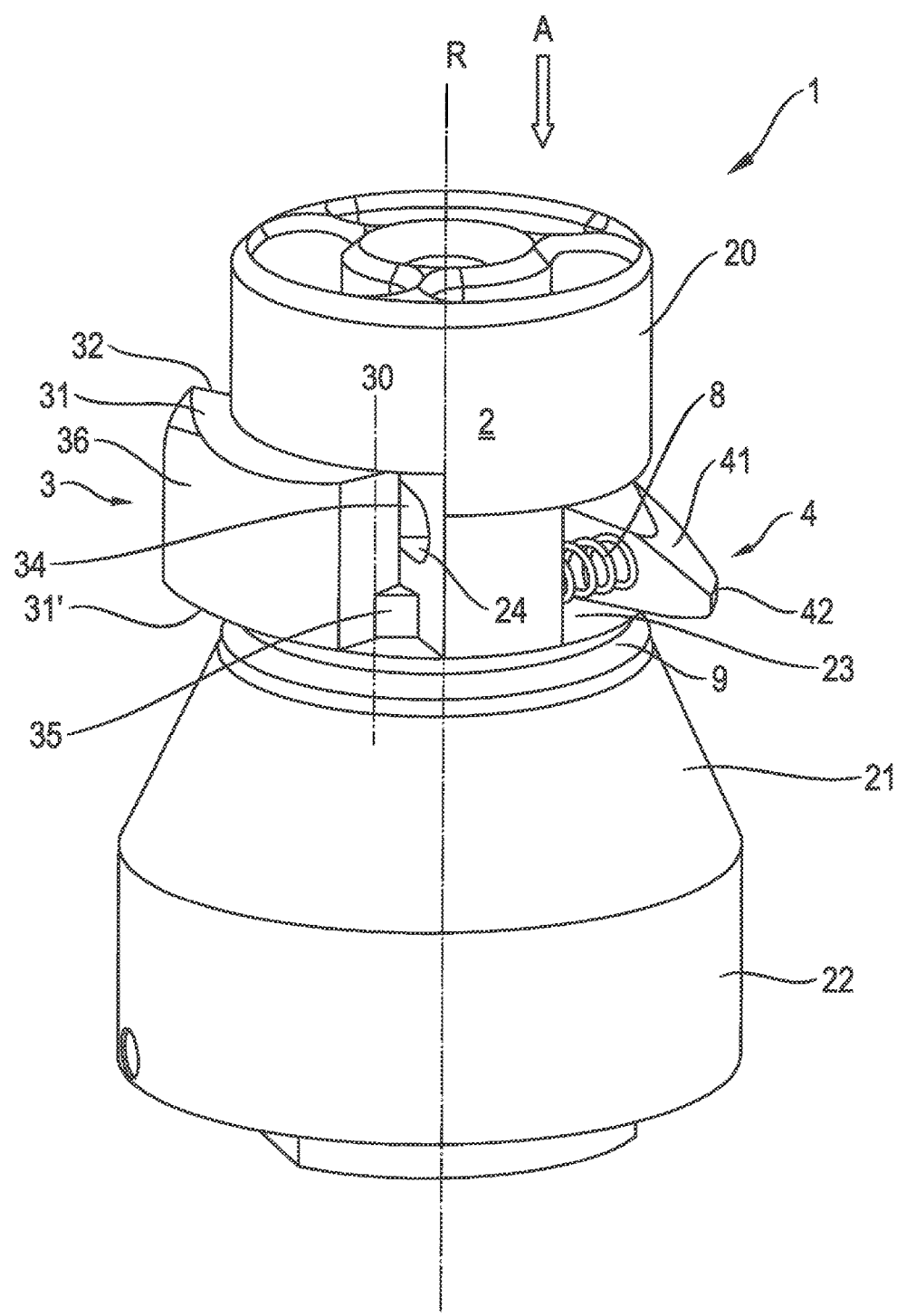
FIG. 1(A) is a perspective view of a drive head of the invention.
Figure 1B:
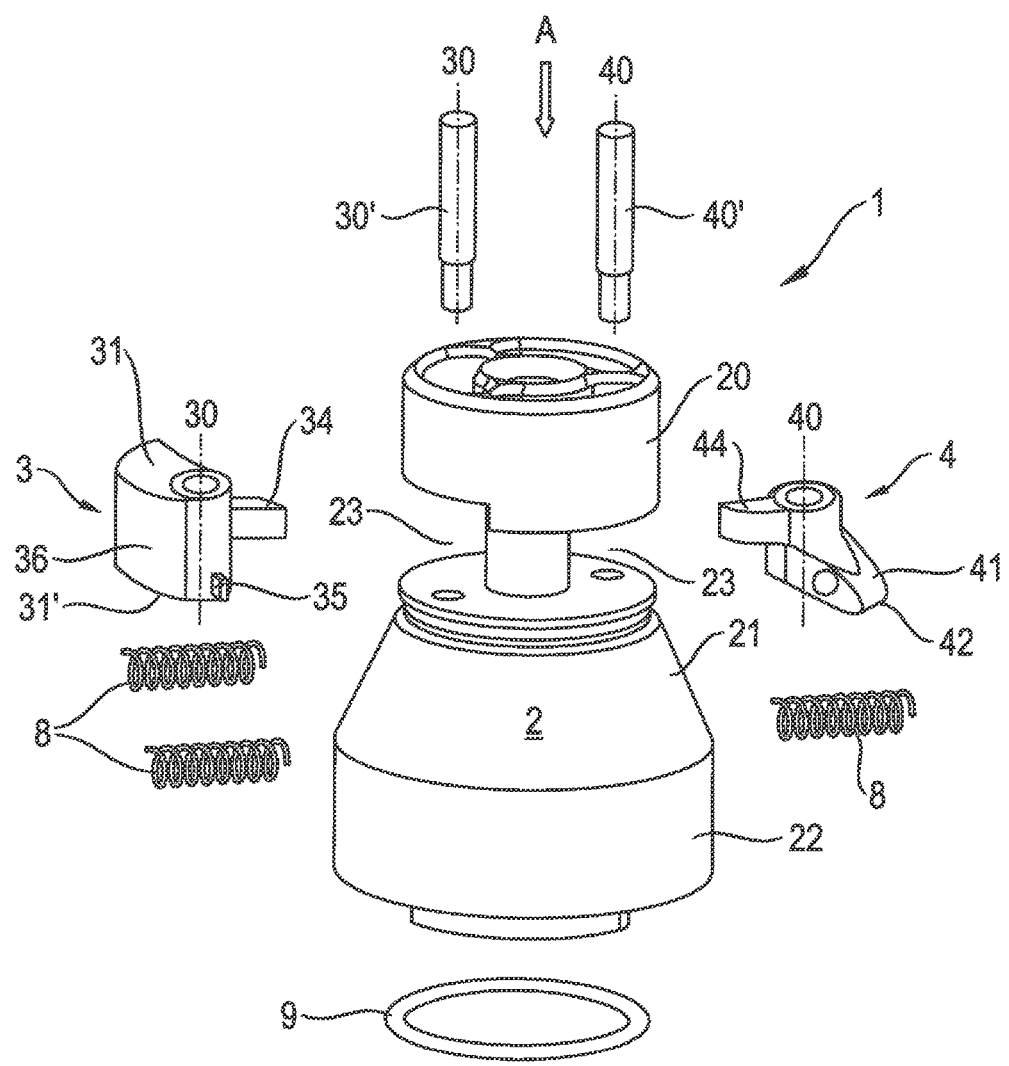
FIG. 1(B) is an exploded view of the drive head as shown in FIG. 1(A)

FIG. 1(A) is a perspective view of a centrifuge drive head 1 according to one embodiment of the present invention; FIG. 1(B) shows the same drive head in the form of an exploded view. The drive head 1 comprises a base body 2 comprising a substantially cylindrical top region 20 and a lower region 21 in the form of a truncated cone. This portion is adjoined by a bottom cylindrical region 22. Between the top region 20 and the lower region 21 of the drive head there are located two coupling elements 3 and 4 that are in the form of pivotal wedges.

According to one aspect of the present invention, the two coupling elements 3 and 4 differ from each other. In the example shown, they differ in terms of their geometric shape and material. The first coupling element 3 is larger and more massive than the second coupling element 4. The coupling element 3 is made of steel in the example shown while the coupling element 4 is made of titanium. Both steel and titanium have very high strength values, but titanium has a substantially lower density. Furthermore, the geometric shape of the coupling elements 3 and 4 is different. The coupling element 3 has an upper cover face 31 and a bottom cover face 31' that extend substantially horizontally, that is to say, in planes extending at right angles to the axis of rotation R of the drive head 1. The external peripheral surface 36 is curved in the radial direction, and the curvature follows the roundness of the cylindrical peripheral surface of the top region 20 of the drive head 1. The coupling element 3 is pivotally mounted in a recess 23 in the top region 20 of the drive head 1 so as to be pivotable about a swivel axis 30. The external contour of the coupling element 3 in its inwardly pivoted state matches that of the cylindrical top region 20 and is substantially flush therewith. A pin 30' inserted through bores in the drive head 1 and the coupling element 3 serves for the purpose of mounting the pivotal coupling element 3.

The coupling element 3 is biased by springs 8 that urge it outwardly away from the drive head 1. Thus the coupling element 3 pivots outwardly, at least in part, from the drive head 1 even in the absence of a centrifugal force acting on the drive head 1, that is to say, in the idle state of the centrifuge. In this way, it is possible to lock the drive head and the rotor even in the idle state of the centrifuge. The outward pivotal movement of the coupling element 3 is stopped by a blocking projection 35 that bears against the wall of the recess 23 when a specific maximum outward pivot angle has been reached. A protrusion 34 capable of sliding into a longitudinal groove 24 of the drive head 1 serves to guide the coupling element 3 back into the recess 23 of the drive head 1.

The mount of the second coupling element 4, its ability to pivot, its bias, and the stoppage of its pivotal movement are similar to those of the first coupling element 3. The second coupling element 4 pivots about the swivel axis 40 and the pin 40'. A protrusion 44 serves to guide its inward pivotal movement. The associated longitudinal groove in the drive head 1 and the blocking projection are not visible due to the angle of the perspective view. The second coupling element 4 is substantially smaller than the first coupling element 3. In place of the horizontal upper cover face 31 of the first coupling element 3, the second coupling element 4 comprises an upper cover face 41 that slopes downwardly towards the free end 42. Thus the second coupling element 4 is substantially wedge-shaped. The external surface of the coupling element 4 that is not visible in the figure and is oriented away from the observer follows the cylindrical peripheral external contour of the top region 20 of the drive head, as in the case of the first coupling element 3.

When a hub is fitted to the drive head in the direction A, the coupling elements 3 and 4 are initially pushed against the bias of the springs 8 into the recesses 23 of the drive head 1 until the hub can be slid past them. Depending on the position and shape of the associated notch in the hub, any one of the coupling elements 3 or 4 selectively, or alternatively both of the coupling elements, can then swing outwardly and thus lock the drive head 1 to the hub. The coupling elements also pivot outwardly in the idle state of the centrifuge, since the coupling elements are biased by the springs 8. The drive head and at least one hub form a set of the present invention. The hub is configured according to the desired operating conditions, and this configuration and particularly the design of the notch in the hub predetermines which of the coupling elements of the drive head will be used for locking the drive head to the hub. This is described below with reference to an example covering different ranges of rotational speeds, at which a centrifuge of the invention comprising a set of the invention is to operate.

Figure 2:
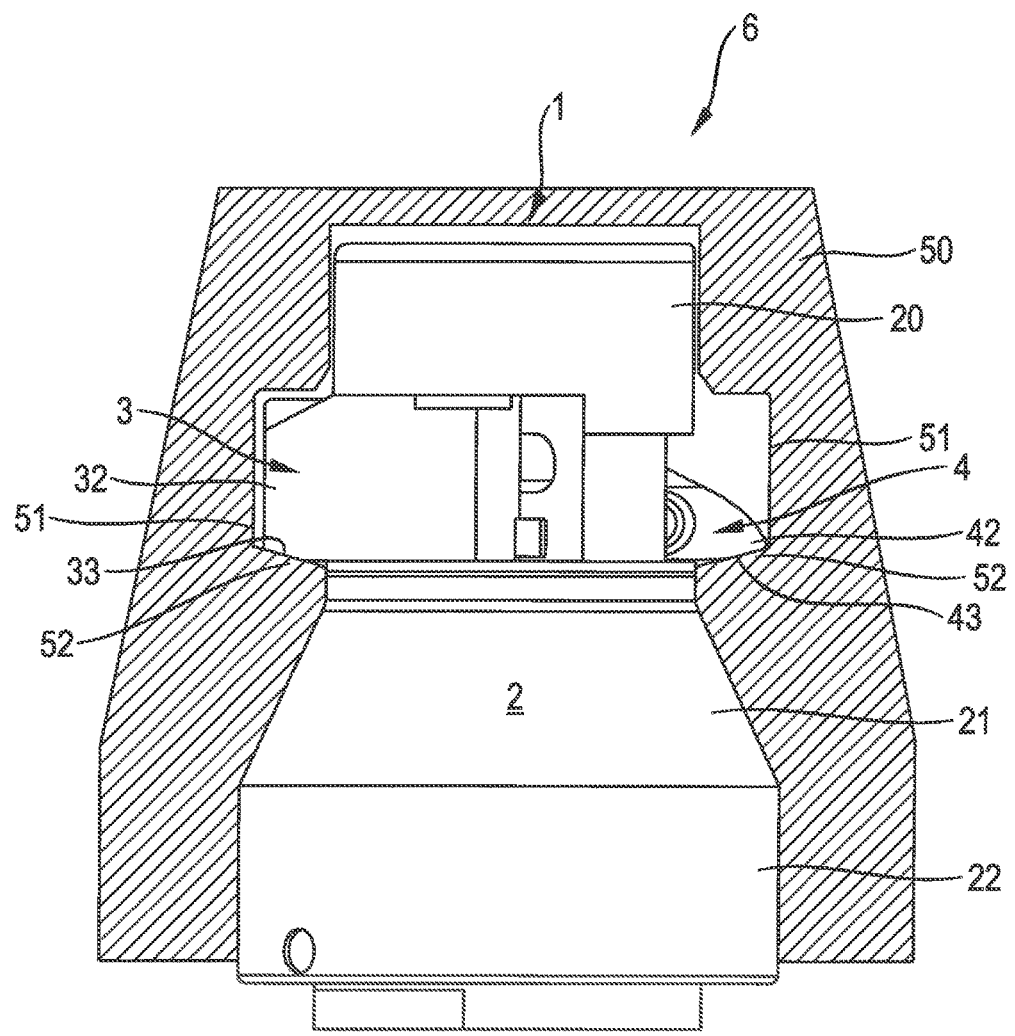
FIG. 2 is a partial sectional view of a set of the present invention consisting of a drive head and a hub.
Figure 3:
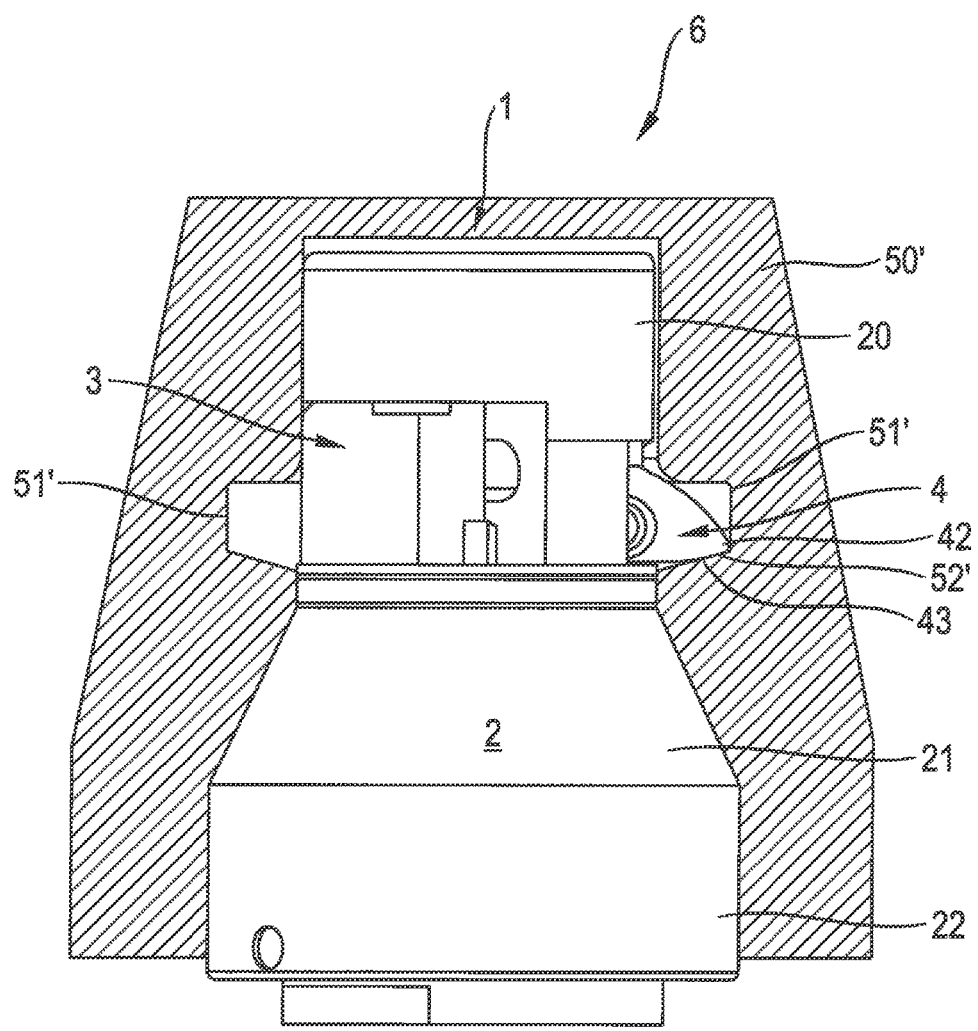
FIG. 3 is a further embodiment of a set of the present invention comprising the same drive head as shown in FIG. 2 but a different hub.

FIG. 2 shows a set 6 consisting of the drive head 1, as shown in FIGS. 1 (A) and 1 (B) and a hub 50 for a low speed range, FIG. 3 shows a set 6 consisting of the drive head 1 and a hub 50' for a high speed range. The two hubs 50 and 50' each comprise an internal notch 51 and 51' respectively that substantially follows the external contours of the drive head 1, and the hubs 50 and 50' bear positively against the drive head 1 over large areas thereof when the drive head 1 has been fully inserted into the hub 50, 50'. The sequence of cylindrical and conical regions ensures that both the drive head and the hub are centered satisfactorily and are reliably secured against forming an angle of inclination. A sealing ring 9 made of elastomer and situated between the top cylindrical portion 20 and the conical portion 21 of the drive head 1 further improves the support of the drive head and the hub. The two notches 51 and 51' of the hubs 50 and 50' respectively differ from each other merely in the region in which they are located opposite the coupling elements 3 and 4. In the case of the low speed hub 50, the notch is clearly larger in this region than in the case of the high speed hub 50'. As a result, both the first coupling element 3 and the second coupling element 4 can swing into the hub 50 with their free ends 32 and 42 respectively. However, the notch 51' provided on the hub 50' is not large enough for the first coupling element 3 so that the latter remains in its inwardly pivoted state in the recess 23 of the drive head 1. Thus in the case of the low speed hub 50, both coupling elements 3 and 4 contribute to locking the drive head 1 to the hub, while only the second coupling element 4 is effective for this purpose in the high speed hub 50'. Thus, in the latter case, the heavy and massive first coupling element 3 is prevented from becoming wedged into the notch at high rotational speeds of, say, more than 10,000 rpm, which would render it incapable of being disengaged from the hub subsequently to the centrifugation process. Due to the tapered upper cover face and consequently low weight of the second coupling element 4, it is virtually impossible for it to become wedged in the hub 50'. By contrast, at low rotational speeds, at which the risk of the coupling elements becoming wedged in the notch in the hub is considerably smaller, both of the coupling elements cooperate in the process of locking the drive head 1 to the hub and thus counteract the buoyancy forces acting on the hub during operation.

It can be further seen from FIGS. 2 and 3 that the bottom cover faces of the coupling elements 3 and 4 located contrary to the direction A in which the hub is fitted to the drive head have beveled ramp shaped faces 33 and 43 respectively in the region adjoining their free ends 32, 42. The ramp shaped faces 33, 43 slide over complementarily beveled ramp shaped stop faces 52, 52' when the coupling elements pivot outwardly. The locking force can be predetermined very precisely, as required, by specifically setting the angle of inclination of the ramp shaped (stop) faces.

The drive head is detached from the hub by pressing the coupling elements 3 and/or 4 out of the notch 51, 51' of the hub and into the recess 23 of the drive head 1. This can be achieved by means of a suitable actuator (not shown in the figure). For example, the actuator can act on the protrusions 34, 44 and thus cause the coupling elements 3, 4 to pivot inwardly. Alternatively, levers or pins pressing the coupling elements laterally can push the coupling elements inwardly, or the notches of the hub that receive the coupling elements can have a depth that decreases in the peripheral direction so that rotation of the hub, advantageously against the rotational direction of the centrifugation process, pushes the coupling elements towards the drive head. It is then possible to remove the hub from the drive head.

Figure 4:
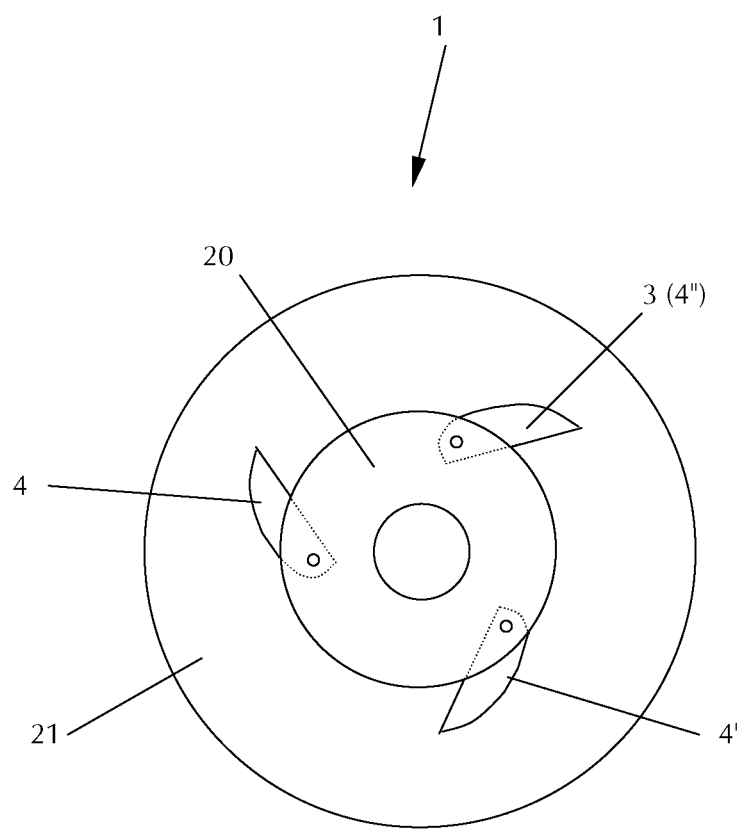
FIG. 4 is a view of another example of a drive head seen from the push-one side of the rotor.

FIG. 4 is a view from the push-on direction of the rotor (corresponding to arrow A in FIG. 1(A)) onto a further embodiment of a drive head 1. Here, two second coupling elements 4, 4' are present in addition to a first coupling element 3. The three coupling elements are pivotally mounted circumferentially at essentially equal distances to the drive head. While the second coupling elements 4, 4' are equal with respect to their form and weight, the first coupling element 3 as a greater height in the axial direction and thus a greater weight than the second coupling elements 4, 4'. The drive head shown in FIG. 4 can be used together with a set of hubs 50, 50' as described in FIGS. 2 and 3. That is, all three coupling elements 3, 4, 4' engage with the low speed hub 50 while only coupling elements 4, 4' do so with the high speed hub 50'. Using three circumferentially distributed coupling elements has the advantage that hub and drive head are especially stably engaged and wobbling of one relative to the other is avoided. In an alternative embodiment, three identical circumferentially distributed coupling elements can be used in combination with at least one different coupling element, which latter is then preferably attached at a different axial height of the drive head relative to the other coupling elements. For example, three first coupling elements can be arranged in one plane combined with three second couplings elements 4, 4', 4" arranged in another plane.

Figure 5A:
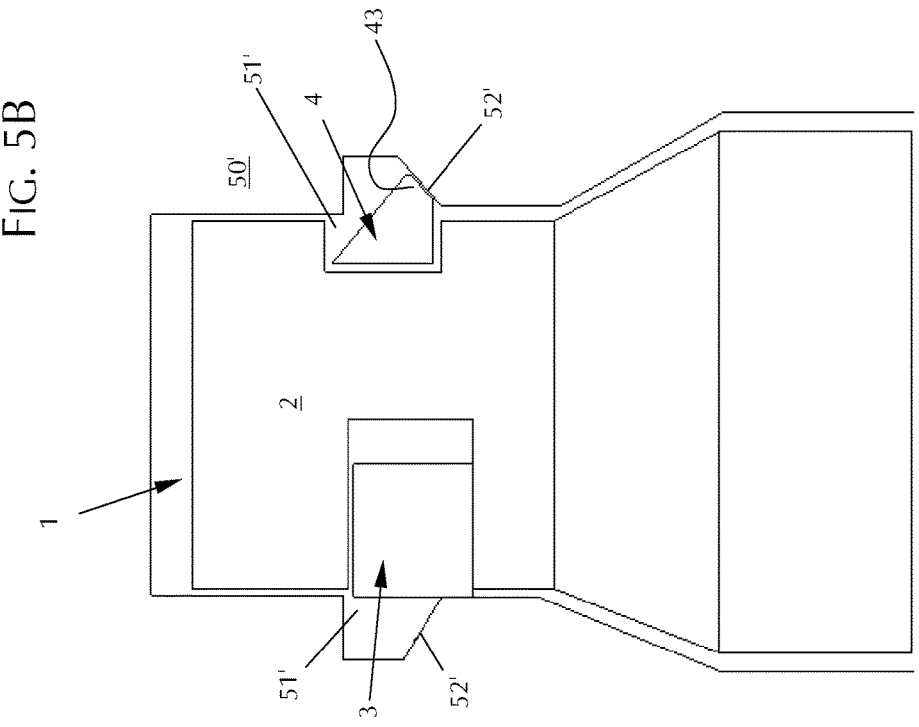
FIG. 5(A) is a cross-sectional view of a further set of the present invention consisting of a drive head and a hub.
Figure 5B:
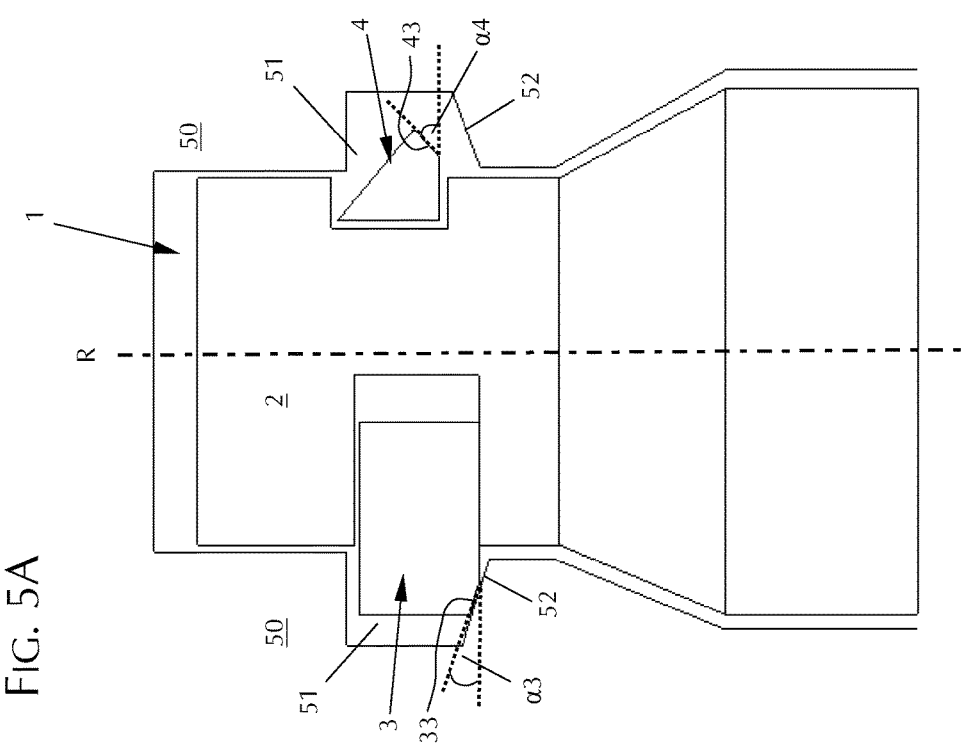
FIG. 5(B) is a cross-sectional view of the set as shown in FIG. 4(A) comprising a different hub.

FIGS. 5 and 6 show further possible embodiments of sets of the present invention comprising a drive head 1 and hubs 50, 50'. In all cases, the hub 50 is used for the low speed range, while the hub 50' is used at higher rotational speeds. The set shown in FIGS. 5(A) and 5(B) is similar to that as shown in FIGS. 2 and 3. However, it differs from the latter in the operation of the low speed hub 50. Here, the high speed coupling element 4 with its bottom cover face is displaced upwardly relatively to the low speed coupling element 3. Thus, during the operation of the hub 50, only the coupling element 3 rests by means of its ramp shaped face 33 against the ramp shaped stop face 52 of the notch 51 of the hub 50, while the likewise outwardly pivoted coupling element 4 has no contact with the walls of the notch 51 and therefore does not contribute to the process of locking the drive head 1 to the hub. By contrast, during the operation of the hub 50', the coupling element 3 is hindered from pivoting outwardly by the smaller and more elevated notch 51'. Only the coupling element 4 can swing into the notch 51', where it bears with its ramp shaped face 43 against the ramp shaped stop face 52'. The ramp shaped stop faces 52 and 52' as well as the ramp shaped faces 33 and 43 can be at different angles of inclination in this case. The angle of inclination $\alpha 3$ of the ramp shaped face 33 of the first coupling element 3 relative to a plane extending at right angles to the axis of rotation R is smaller than the angle of inclination $\alpha 4$ of the ramp shaped face 43 of the second coupling element 4. The locking force acting on the first coupling element corresponds thereto.

FIGS. 6(A) and 6(B) show an example, in which two first coupling elements 3, 3' and two second coupling elements 4, 4' are used in each case. The use of more than a total of two coupling elements allows the locking forces to be matched even better with the operating conditions of a centrifuge. For use in the low speed range, two first coupling elements 3, 3' are positioned approximately opposite each other on the drive head 1. Two second coupling elements 4, 4' are likewise disposed opposite each other below the coupling elements 3, 3'. In order to accommodate the four coupling elements, the top cylindrical region 20 of the drive head 1 is longer than that in the previous examples comprising only two coupling elements. As viewed across the total length of the drive head 1, the coupling elements are located approximately at the center thereof, and the second coupling elements 4, 4', which are subjected to higher rotational speeds are, in their outwardly pivoted state, located closer to the center of the drive head 1 than the first coupling elements 3, 3'. This arrangement very reliably secures the hub and the drive head from forming an angle of inclination. The hubs 50 and 50' are configured such that only the first coupling elements 3, 3' pivot outwardly in the case of low rotational speeds (hub 50), while the second coupling elements 4, 4' assume the locking function in the case of higher rotational speeds (hub 50').

With reference to an example, FIG. 7 shows the locking forces of the first coupling element 3 and of the second coupling element 4 as a function of the rotational speed. The bias (spring force) of the springs 8 and the forces applied by the coupling elements on the hub are also shown as a function of the centrifugal force. The spring force is independent of the rotational speed and it is determined only by the type and number of springs 8 used. The bias acting on the heavier first coupling element 3 is greater than that used for the second coupling element 4 (cf. for example, FIG. 1(B), in which two springs 8 are used for the coupling element 3 while only one is used for the coupling element 4). By contrast, the clamping forces, by means of which the coupling elements act on the hub, vary with the rotational speed. The figure shows a case which corresponds to FIGS. 2 and 3 and in which the first coupling element 3 is used in the low speed range (up to approximately 10,000 rpm in this case), while the second coupling element 4 contributes to the locking function in conjunction with the first coupling element 3 in the low speed range, but is then solely responsible for the locking function in the high speed range. As can be seen from the graph of the forces, the clamping force of the first coupling element 3 rises more sharply than that of the second coupling element 4 at increasing rotational speeds, which is due to the greater weight of the first coupling element 3. Thus a sufficient and secure locking effect is ensured even at relatively low rotational speeds. By contrast, the clamping force of the second coupling element 4 rises more slowly due to its relatively low weight in the high speed range, in which only the second coupling element 4 assumes a locking function. Thus it is possible to reliably prevent the second coupling element 4 from getting jammed in the hub at very high rotational speeds. Altogether, rotational speeds ranging from 0 to approximately 30,000 rpm can be accommodated in this way.

Figure 8:
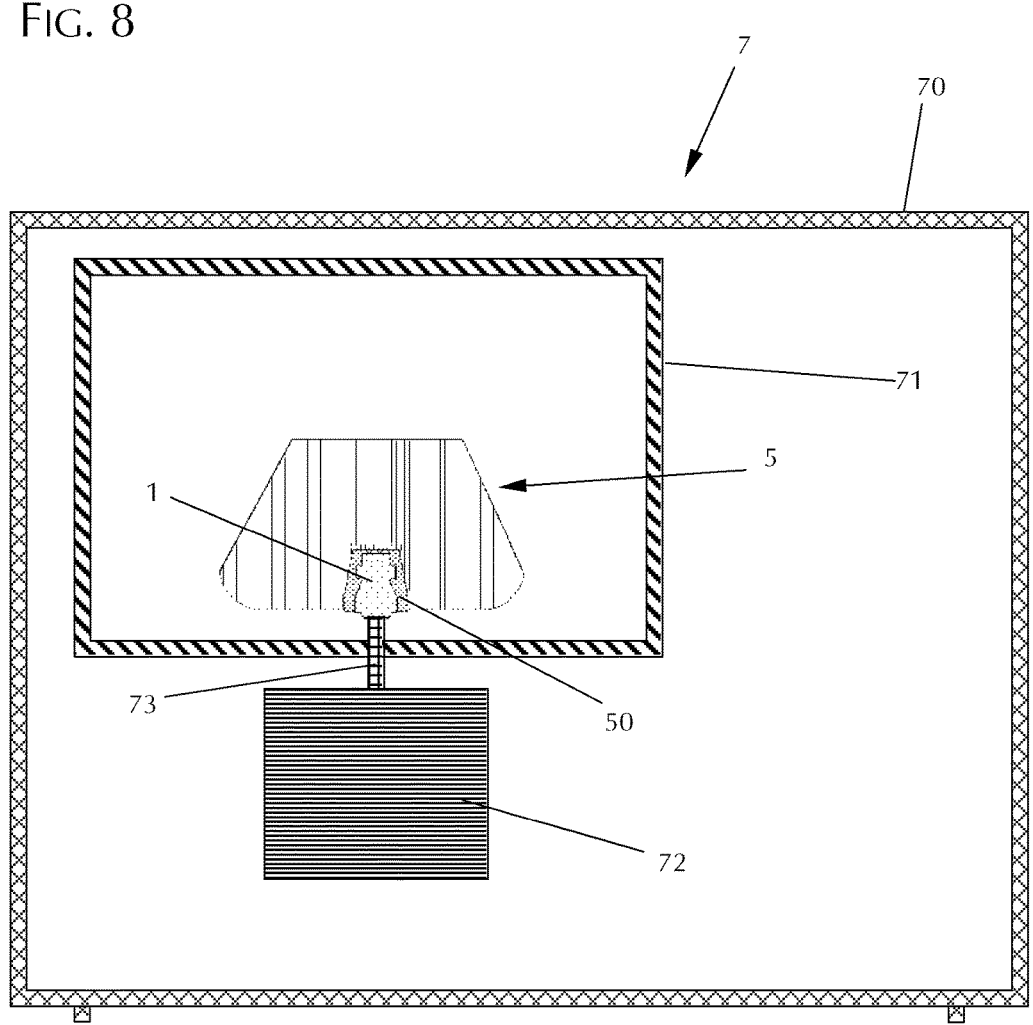
FIG. 8 is a cross-section of a centrifuge of the invention.

Finally, FIG. 8 shows, in a greatly simplified form, a centrifuge 7 of the present invention, which is usually a standing centrifuge on account of the large speed ranges that can be accommodated by the set of the present invention. It consists of the drive head and the hub. The use of the set of the present invention in a bench-top centrifuge is basically also feasible. Inside an external housing 70 there is disposed a rotor housing 71, in which a centrifuge rotor 5 is disposed. The centrifuge rotor 5 is in turn connected to a hub 50 that is fitted to a drive head 1 and is locked in position on the same as described above by means of coupling elements (not shown in this figure). The rotor 5 is caused to rotate by means of a motor 72 via a drive shaft 73 attached to the drive head 1. A suitable hub, here a low speed hub 50, is used depending on the rotational speed to be transferred.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicants' invention.

What is claimed is:

1. A set for a centrifuge having a centrifuge drive head for releasably connecting a driving system to a rotor of a centrifuge, and a hub for a rotor having at least one recess, the set comprising:
    a hub for a rotor having at least one recess; and
    a centrifuge drive head comprising:
        a base body mounted for rotation about an axis of rotation (R); and
        at least one first coupling element and at least one second coupling element mounted on the base body for swinging outwardly about a swivel axis,
    wherein said at least one first and second coupling elements differ from each other in at least one of the following properties:
        a respective outer shape of said at least one first and second coupling elements,
        a respective mass of said at least one first and second coupling elements,
        a respective material of said at least one first and second coupling elements, and/or
        a respective mounting height of said at least one first and second coupling elements on the base body as regarded with respect to said axis of rotation (R),
    wherein said at least one first coupling element is adapted to couple, in use, a rotor including said hub in a first rotational speed range; and said at least one second coupling element is adapted to couple, in use, a rotor including said hub in a second rotational speed range different from the first rotational speed range,
    and further wherein said at least one recess is configured such that only one of said at least one first and said second coupling elements can swing into said at least one recess and come into contact with at least one wall delimiting said at least one recess when said hub is mounted on said centrifuge drive head.

2. The set as recited in claim 1,
wherein said at least one first coupling element is larger and/or heavier than said at least one second coupling element.

3. The set as recited in claim 1,
wherein said at least one first coupling element comprises an upper cover face facing towards a push-on side (A) of said rotor and a lower cover face more remote from said push-on side (A) of said rotor, which upper and lower cover faces are located in planes that are substantially parallel to each other and at right angles to said axis of rotation (R).

4. The set as recited in claim 1,
wherein said at least one second coupling element tapers towards an outwardly pivotable free end thereof.

5. The set as recited in claim 1,
wherein said at least one first and/or said second coupling elements has at an outwardly pivotable end thereof a ramp shaped face that slopes relatively to a plane at right angles to said axis of rotation (R), wherein said ramp shaped face is formed on a lower side thereof facing away from said push-on side (A) of said rotor and slopes upwardly towards said outwardly pivotable end.

6. The set as recited in claim 5,
wherein said at least one first and said second coupling elements differ in terms of a gradient of their ramp shaped faces, wherein the angle of inclination relative to a plane at right angles to said axis of rotation (R) is smaller in the case of said ramp shaped face on said first coupling element than the angle of inclination of said ramp shaped face on said second coupling element.

7. The set as recited in claim 1,
further comprising at least one third coupling element and at least one fourth coupling element, wherein the at least one first and second coupling elements are disposed above the at least one third and fourth coupling elements in the direction of said axis of rotation (R).

8. The set as recited in claim 1,
further comprising at least a third coupling element,
wherein the at least one first, second and third coupling elements are arranged circumferentially around the centrifuge drive head.

9. The set as recited in claim 1,
wherein said base body comprises an upper region, with respect to a mounting direction of said rotor, which region has a substantially cylindrical outer contour, and a lower region adjoining said upper region in the form of a truncated cone, wherein said coupling elements are disposed in at least one recess in said upper region adjacent to said truncated-cone-shaped lower region.

10. The set as recited in claim 9,
wherein said lower region is adjoined by a bottom cylindrical region.

11. The set as recited in claim 1,
wherein said at least one recess of said hub comprises at least one first recess and/or second recess extending in the peripheral direction.

12. The set as recited in claim 1,
further comprising a rotor which is connected to said hub.

13. A centrifuge,
comprising a set as recited in claim 1.

14. A set for a centrifuge, comprising:
a centrifuge drive head for releasably connecting a driving system to a rotor of a centrifuge, wherein a base body of the centrifuge drive head is mounted for rotation about an axis of rotation, wherein at least one first coupling element and at least one second coupling element are mounted on the base body for swinging outwardly about a swivel axis, and wherein the at least one of said first and second coupling elements differ from each other, and a first hub for a rotor having a recess,
A) wherein the first hub is configured such that only one of said at least one first or said at least one second coupling elements can swing into said recess and come into contact with at least one wall delimiting said recess when said first hub is mounted on said centrifuge drive head, or
B) wherein the recess allows said at least one first and said at least one second coupling elements to swing into said recess when said first hub is mounted on said centrifuge drive head, and further wherein said at least one first coupling element comes into contact with at least one wall delimiting said recess, while said at least one second coupling element does not bear against the at least one wall delimiting said recess.

15. The set as defined in claim 14,
wherein, in alternative A), the set comprises the first hub and a different second hub, of which said respective recesses are differently formed such that said first hub allows only said at least one first coupling element, and said second hub only said at least one second coupling element, to swing into the respective recess when said first or second hub is mounted on said centrifuge drive head.

16. The set as defined in claim 14,
wherein, in alternative B), the set comprises a first hub and a different second hub, of which the recesses of said first and second hubs are differently formed such that said first hub allows said at least one first and second coupling elements to swing into the recess of the first hub and said second hub allows only said at least one second coupling element to swing into the recess of said second hub when said first or second hub is mounted on said centrifuge drive head, wherein in the case of said first hub, said at least one second coupling element does not bear against the at least one wall delimiting said recess of said first hub, while said at least one first coupling element is in contact with the at least one wall delimiting said recess of said first hub.

17. A set for a centrifuge having a centrifuge drive head for releasably connecting a driving system to a rotor of a centrifuge, and a hub for a rotor having at least one recess, the set comprising:
a hub for a rotor having at least one recess; and
a centrifuge drive head comprising:
a base body mounted for rotation about an axis of rotation (R); and
at least one first coupling element and at least one second coupling element mounted on the base body for swinging outwardly about a swivel axis,
wherein said at least one first and second coupling elements differ from each other in at least one of the following properties:
a respective outer shape of said at least one first and second coupling elements,
a respective mass of said at least one first and second coupling elements,
a respective material of said at least one first and second coupling elements, and/or
a respective mounting height of said at least one first and second coupling elements on the base body as regarded with respect to said axis of rotation (R),
wherein said at least one first coupling element is adapted to couple, in use, a rotor including said hub in a first rotational speed range; and said at least one second coupling element is adapted to couple, in use, a rotor including said hub in a second rotational speed range different from the first rotational speed range,
and further wherein said recess allows said at least one first and said second coupling elements to swing into said recess when said hub is mounted on said centrifuge drive head, wherein said at least one first coupling element comes into contact with at least one of the walls delimiting said at least one recess, while said at least one second coupling element does not bear against the walls of said at least one recess.

18. A set for a centrifuge having a centrifuge drive head for releasably connecting a driving system to a rotor of a centrifuge, and a first hub and a second hub for a rotor, the set comprising:
a first hub and a second hub for a rotor; and
a centrifuge drive head comprising:
a base body mounted for rotation about an axis of rotation (R); and
at least one first coupling element and at least one second coupling element mounted on the base body for swinging outwardly about a swivel axis,
wherein said at least one first and second coupling elements differ from each other in at least one of the following properties:
a respective outer shape of said at least one first and second coupling elements,
a respective mass of said at least one first and second coupling elements,
a respective material of said at least one first and second coupling elements, and/or
a respective mounting height of said at least one first and second coupling elements on the base body as regarded with respect to said axis of rotation (R),
wherein said at least one first coupling element is adapted to couple, in use, a rotor including one of said first or second hubs in a first rotational speed range; and said at least one second coupling element is adapted to couple, in use, a rotor including one of said first or second hubs in a second rotational speed range different from the first rotational speed range,
and further wherein the first hub has a first recess and the second hub has a second recess, of which said first and second recesses are differently formed such that said first hub allows only said at least one first coupling element, and said second hub only said at least one second coupling element, to swing into the respective first and second recesses when said hub is mounted on said centrifuge drive head.

19. A set for a centrifuge having a centrifuge drive head for releasably connecting a driving system to a rotor of a centrifuge, and a first hub and a second hub for a rotor, the set comprising:
- a first hub and a second hub for a rotor; and
- a centrifuge drive head comprising:
  - a base body mounted for rotation about an axis of rotation (R); and
  - at least one first coupling element and at least one second coupling element mounted on the base body for swinging outwardly about a swivel axis,
  - wherein said at least one first and second coupling elements differ from each other in at least one of the following properties:
    - a respective outer shape of said at least one first and second coupling elements,
    - a respective mass of said at least one first and second coupling elements,
    - a respective material of said at least one first and second coupling elements, and/or
    - a respective mounting height of said at least one first and second coupling elements on the base body as regarded with respect to said axis of rotation (R),
  - wherein said at least one first coupling element is adapted to couple, in use, a rotor including one of said first or second hubs in a first rotational speed range; and said at least one second coupling element is adapted to couple, in use, a rotor including one of said first or second hubs in a second rotational speed range different from the first rotational speed range,
- and further wherein the first hub has a first recess and the second hub has a second recess, of which said first and second recesses are differently formed such that said first hub allows said at least one first and second coupling elements to swing into its first recess and said second hub allows only said at least one second coupling element to swing into its second recess when said hub is mounted on said centrifuge drive head.

20. The set as recited in claim 19,
wherein, in the case of said first hub, said at least one second coupling element does not bear against walls of said first recess, which said at least one first coupling element is in contact with at least one of the walls delimiting said first recess.

21. A set for a centrifuge having a centrifuge drive head for releasably connecting a driving system to a rotor of a centrifuge, and a hub for a rotor having at least one recess, the set comprising:
- a hub for a rotor having at least one recess; and
- a centrifuge drive head comprising:
  - a base body mounted for rotation about an axis of rotation (R); and
  - at least one first coupling element and at least one second coupling element mounted on the base body for swinging outwardly about a swivel axis,
  - wherein said at least one first and second coupling elements differ from each other in at least one of the following properties:
    - a respective outer shape of said at least one first and second coupling elements,
    - a respective mass of said at least one first and second coupling elements,
    - a respective material of said at least one first and second coupling elements, and/or
    - a respective mounting height of said at least one first and second coupling elements on the base body as regarded with respect to said axis of rotation (R),
  - wherein said at least one first coupling element is adapted to couple, in use, a rotor including said hub in a first rotational speed range; and said at least one second coupling element is adapted to couple, in use, a rotor including said hub in a second rotational speed range different from the first rotational speed range,
- and further wherein, with respect to the direction of said axis of rotation (R), an upper or lower wall that delimits said at least one recess of the hub is configured, at least in certain regions, as a ramp shaped stop face that is complementary to a ramp shaped face of said at least one first or at least one second coupling element capable of swinging into the said at least one recess.

22. A set for a centrifuge having a centrifuge drive head for releasably connecting a driving system to a rotor of a centrifuge, and a hub for a rotor having at least one recess, the set comprising:
- a hub for a rotor having at least one recess; and
- a centrifuge drive head comprising:
  - a base body mounted for rotation about an axis of rotation (R); and
  - at least one first coupling element and at least one second coupling element mounted on the base body for swinging outwardly about a swivel axis,
  - wherein said at least one first and second coupling elements differ from each other in at least one of the following properties:
    - a respective outer shape of said at least one first and second coupling elements,
    - a respective mass of said at least one first and second coupling elements,
    - a respective material of said at least one first and second coupling elements, and/or
    - a respective mounting height of said at least one first and second coupling elements on the base body as regarded with respect to said axis of rotation (R),
  - wherein said at least one first coupling element is adapted to couple, in use, a rotor including said hub in a first rotational speed range; and said at least one second coupling element is adapted to couple, in use, a rotor including said hub in a second rotational speed range different from the first rotational speed range,
  - wherein said at least one second coupling element tapers towards an outwardly pivotable free end thereof,
- and further wherein said at least one second coupling element comprises an upper cover face facing a push-on side (A) of said rotor and configured so as to slope downwardly towards said outwardly pivotable end.

\* \* \* \* \*

UNITED STATES PATENT AND TRADEMARK OFFICE
CERTIFICATE OF CORRECTION

PATENT NO. : 9,718,067 B2
APPLICATION NO. : 13/912299
DATED : August 1, 2017
INVENTOR(S) : Norman Ballhause et al.

Page 1 of 1

It is certified that error appears in the above-identified patent and that said Letters Patent is hereby corrected as shown below:

In the Specification

In Column 3, Line 36, change "More particularly, the notch has for this purpose a size, shape, and/or position in the hub that allows it to accommodate one of the two coupling elements, but prevents the other coupling element from pivoting" to --More particularly, the notch has for this purpose a size, shape, and/or position in the hub that allow it to accommodate one of the two coupling elements, but prevent the other coupling element from pivoting--.

In Column 4, Line 34, change "of the total area of an cover face." to --of the total area of a cover face.--.

In Column 8, Line 67, change "from the push-one side of the rotor;" to --from the push-on side of the rotor;--.

In Column 11, Line 44, change "element 3 as a greater height" to --element 3 has a greater height--.

In the Claims

In Claim 5, Column 14, Lines 30-33, change "wherein said at least one first and/or said second coupling elements has at an outwardly pivotable end thereof a ramp shaped face that slopes relatively to a plane at right angles to said axis of rotation (R)," to --wherein said at least one first and/or said second coupling elements have at an outwardly pivotable end thereof a ramp shaped face that slopes relative to a plane at right angles to said axis of rotation (R),--.

Signed and Sealed this
Fourteenth Day of November, 2017

Joseph Matal
*Performing the Functions and Duties of the*
*Under Secretary of Commerce for Intellectual Property and*
*Director of the United States Patent and Trademark Office*